United States Patent
Pieh et al.

(10) Patent No.: US 7,910,832 B2
(45) Date of Patent: Mar. 22, 2011

(54) LINE ROUTING DEVICE

(75) Inventors: Mario Pieh, Marktbreit (DE); Norbert Friedrich, Rauhenebrach (DE); Alexander Meyer, Greding (DE); Matthias Heitmeier, Dachau (DE)

(73) Assignee: LEONI Bordnetz-Systeme GmbH, Nuremberg (DE)

( * ) Notice: Subject to any disclaimer, the term of this patent is extended or adjusted under 35 U.S.C. 154(b) by 0 days.

(21) Appl. No.: 12/578,464

(22) Filed: Oct. 13, 2009

(65) Prior Publication Data

US 2010/0147586 A1 Jun. 17, 2010

Related U.S. Application Data

(63) Continuation of application No. PCT/EP2008/002449, filed on Mar. 28, 2008.

(30) Foreign Application Priority Data

Apr. 12, 2007 (DE) .......................... 10 2007 017 286

(51) Int. Cl.
*H02G 11/00* (2006.01)
(52) U.S. Cl. .................. 174/99 R; 174/68.1; 174/68.3; 174/69; 439/501; 378/194
(58) Field of Classification Search ............... 174/72 A, 174/68.1, 68.3, 69, 99 R; 296/155; 439/34, 439/501; 378/194
See application file for complete search history.

(56) References Cited

U.S. PATENT DOCUMENTS

| 3,541,334 | A | 11/1970 | Sobolewski et al. |
| 6,494,523 | B2 | 12/2002 | Kobayashi |
| 7,238,029 | B2 | 7/2007 | Tsubaki |
| 7,341,478 | B2 | 3/2008 | Tsubaki et al. |
| 7,345,241 | B2 * | 3/2008 | Caveney et al. ............ 174/99 R |
| 7,654,738 | B2 * | 2/2010 | Fink et al. ...................... 378/194 |
| 7,683,259 | B2 * | 3/2010 | Tsubaki et al. ............. 174/72 A |
| 7,726,723 | B2 * | 6/2010 | Takahashi ...................... 296/155 |
| 7,744,404 | B1 * | 6/2010 | Henson et al. ................. 439/501 |
| 2005/0062310 | A1 | 3/2005 | Kida et al. |
| 2006/0021781 | A1 | 2/2006 | Tsubaki et al. |

FOREIGN PATENT DOCUMENTS

| DE | 1599041 A1 | 6/1971 |
| DE | 102005029827 A1 | 2/2006 |
| DE | 102006002909 A1 | 9/2006 |
| EP | 1108621 A2 | 6/2001 |

OTHER PUBLICATIONS

International Search Report dated Aug. 28, 2008.

* cited by examiner

*Primary Examiner* — Dhiru R Patel
(74) *Attorney, Agent, or Firm* — Laurence A. Greenberg; Werner H. Stemer; Ralph E. Locher

(57) ABSTRACT

A line routing device is provided in order to allow simple, reliable electrical linking, in particular of a motor-vehicle sliding door to a vehicle power supply system. The line routing device includes a housing having a movement opening which extends in longitudinal direction and an outlet opening. A movement element is movably mounted in the movement opening and the cable as well as a spring strip, which is bent in a U-shape, are attached to the movement element. The cable is routed along the spring strip to the outlet opening and an end of the spring strip, which is remote from the movement element, is fixed to the housing.

10 Claims, 1 Drawing Sheet

LINE ROUTING DEVICE

CROSS-REFERENCE TO RELATED APPLICATION

This is a continuation, under 35 U.S.C. §120, of copending International Application No. PCT/EP2008/002449, filed Mar. 28, 2008, which designated the United States; this application also claims the priority, under 35 U.S.C. §119, of German Patent Application DE 10 2007 017 286.0, filed Apr. 12, 2007; the prior applications are herewith incorporated by reference in their entirety.

BACKGROUND OF THE INVENTION

Field of the Invention

The invention relates to a cable or line routing device, in particular for a sliding door in the motor-vehicle field.

A line routing device is often provided for an electrical connection between two components which can move relative to one another. An electrical cable, to which the two components that can move relative to one another are connected, is routed in the line routing device.

In motor-vehicle construction, line routing devices are used, for example, for electrically linking a sliding door to a motor-vehicle power supply system. Such a line routing device has to ensure permanently secure and reliably routing of the cable. In such a case, it is necessary for the cable to be routed in a defined manner during movements. Resetting elements are used in some cases for that purpose, in order to move the cable to an initial state.

Due to cost pressure, which is particularly high in the automobile industry, those requirements must be implemented as cost-effectively as possible.

SUMMARY OF THE INVENTION

It is accordingly an object of the invention to provide a line routing device, which overcomes the hereinafore-mentioned disadvantages of the heretofore-known devices of this general type and which can be used for routing a cable between two components that can move relative to one another, in particular for linking a motor-vehicle sliding door to a motor-vehicle power supply system, with the line routing device having a simple construction and ensuring permanently secure and reliable operation.

With the foregoing and other objects in view there is provided, in accordance with the invention, a line routing device comprising a housing having a movement opening which extends in longitudinal direction and in which a movement element is mounted in such a way that it can move. An electrical cable is attached to the movement element and is provided for an electrical connection between the two components which can move relative to one another. The cable is routed in the direction of an outlet opening within the housing. The cable is routed along a spring strip which is bent in a U-shape, in particular a spring steel strip, which is attached at one end to the movement element and at the other end to the housing in the area of the outlet opening. A strip composed of plastic with appropriate spring characteristics is used as an alternative to a spring steel strip. A defined line routing path is formed by the spring strip, because of the spring strip and its attachment to the movement element, during a relative movement between the two components and a movement associated therewith of the movement element in the movement opening. The spring strip which is bent in a U-shape changes its geometry during the movement in such a way that the U-limbs are moved with respect to one another. The cable, which rests loosely on the spring strip or else is fixed, is routed in a defined manner, independently of the respective position. The use of a spring strip furthermore results in a very simple and therefore cost-effective construction, which ensures permanently reliable operation.

The housing is preferably formed from a base part and a cover part, and the movement element as well as the spring strip can be inserted into the housing when the cover part is removed. This allows quick and simple fitting. In particular, provision is made in this case for the cable together with the movement element and the spring strip, possibly as well as interfaces that are attached at the end, for example plug connectors, to be inserted as a prefabricated cable harness unit into the housing, which then just needs to be closed. In this case in particular, the amount of assembly effort is therefore very low.

In order to further simplify the assembly process, a mounting aid is expediently provided on the base part and is constructed in such a way that, when the cover part is removed, the spring strip is held in a defined mounting position between the mounting aid and a housing wall. The assembly process includes the spring strip being inserted with the cable resting on it between the mounting aid and the housing wall, in such a way that the spring strip cannot jump out of the base part again. The cover part is then mounted on the base part. When the housing is closed, the spring strip is then routed between two opposite housing walls.

The mounting aid in this case is preferably in the form of a holding tab which is integrally formed on the base part and engages over the spring strip in the mounting position. Furthermore, the mounting position is preferably a movement limit position, in which the movement element is located in one of the two limit positions. This serves to simplify the assembly process, since the mounting position is defined in a fixed manner for the prefabricated cable harness.

In order to ensure a simple and at the same time operationally reliable configuration, the movement element is in the form of a sliding element which is guided in the housing wall in the form of a rail guide. In this case, the sliding element engages in a form-locking manner around opposite rim faces of the movement opening, as a result of which the sliding element has at most a small amount of play at right angles to the movement direction. A form-locking connection is one which connects two elements together due to the shape of the elements themselves, as opposed to a force-locking connection, which locks the elements together by force external to the elements.

In order to avoid any load on the cable during operation as far as possible, according to one expedient refinement, the cable is passed through the movement element. The cable is therefore reliably surrounded by the movement element.

Provision is preferably also made for the movement element to include two subelements, specifically a sliding body which can slide along within the movement opening, and a rotating body which is mounted in such a way that it can rotate relative thereto. The cable is passed through this rotating body. The capability of the rotating body to rotate results in the cable being routed reliably, allowing a compensating rotary movement.

In order to ensure defined and secure routing of the spring strip, provision is expediently made for a guide web, which has an approximately U-shaped circumferential shape, to be provided internally on an outer housing wall on the base part.

This means that the spring strip rests on this circumferential web and is pressed in a defined manner against this web by its spring elasticity.

In this case, this guide web is expediently also used at the same time as a guide for the movement element in the movement opening. The movement element therefore engages behind the guide web in a form-locking manner at the same time, in order to form a sliding guide. In this case, the guide web is expediently an integral component of an injection-molded base part. Corresponding to this, the cover part is also additionally or alternatively formed with a corresponding guide web.

In one preferred refinement, the entire line routing device is in the form of a prefabricated mounting unit, which just needs to be fitted into the installation space that is provided. In order to provide for connection of the electrical supply, the line routing device has interfaces at both ends of the cable, in particular plugs to form plug connections. For this purpose, the line routing device has a first cable subelement, which is routed from a first cable interface outside the housing to the movement element, as well as a second cable subelement, which is routed within the housing from the movement element to a second interface in the area of the outlet opening. This refinement, as a prefabricated mounting unit with interfaces which are in particular in the form of plug connectors, allows very simple and fast fitting of the entire line routing device, for example in a production line at an automobile manufacturer.

Other features which are considered as characteristic for the invention are set forth in the appended claims.

Although the invention is illustrated and described herein as embodied in a line routing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
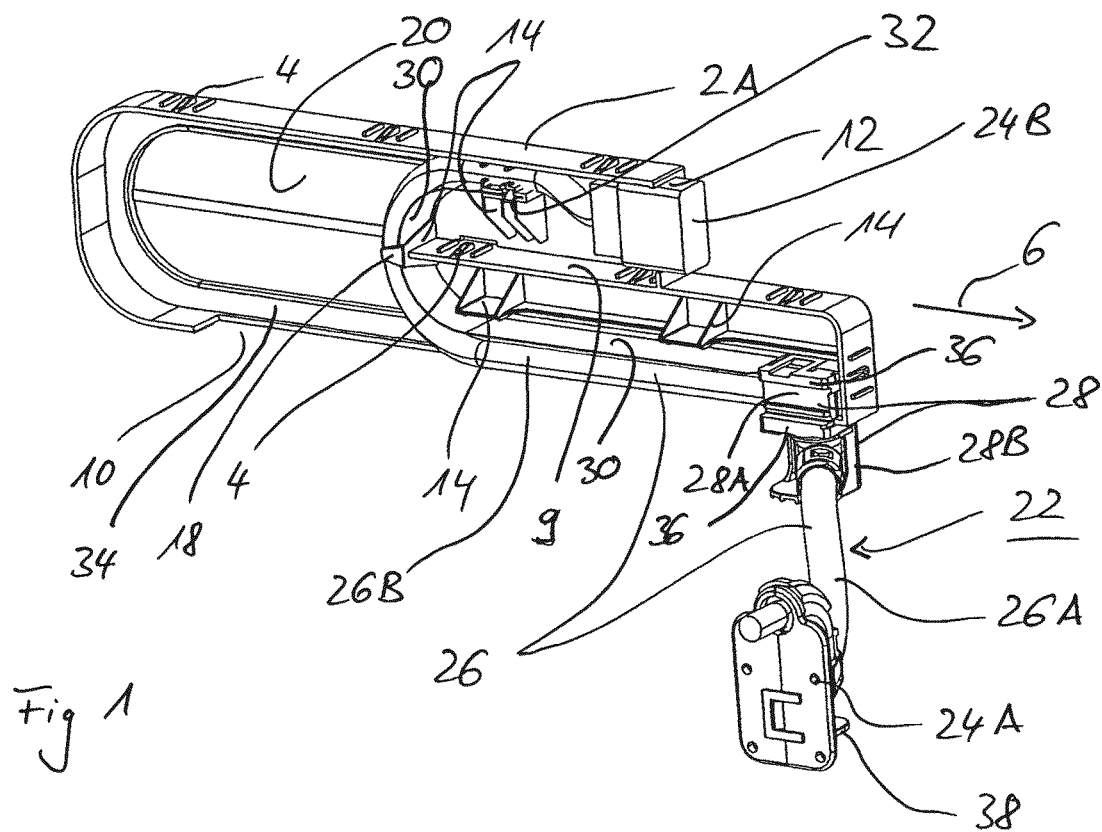
FIG. 1 is a diagrammatic, perspective view of a line routing device with an open housing.
Figure 2:
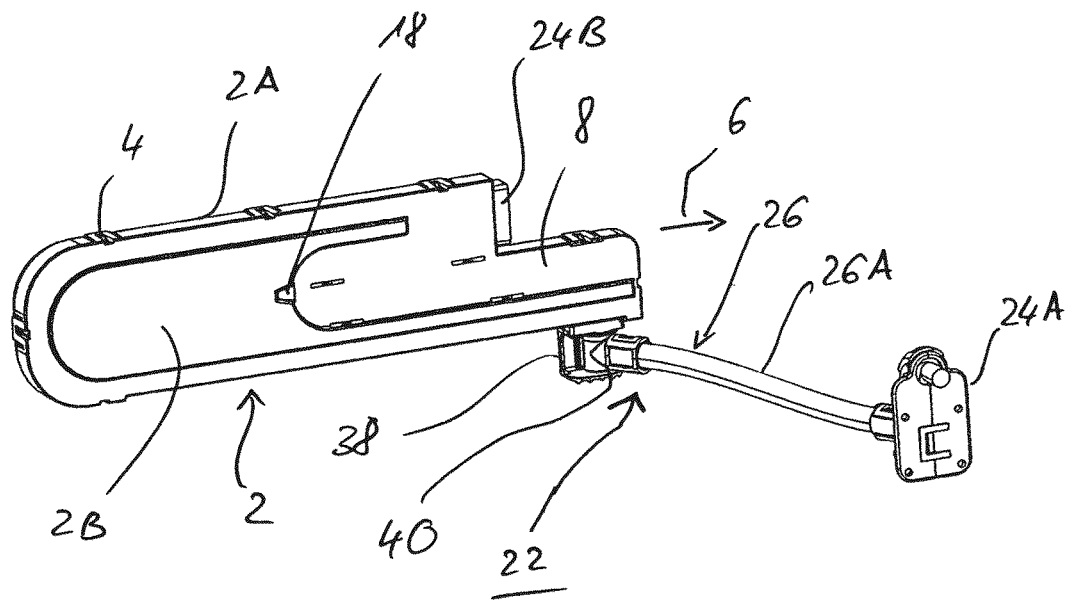
FIG. 2 is a perspective view of the line routing device as shown in FIG. 1, with the housing closed.

Referring now in detail to the figures of the drawings as a whole, there is seen a line routing device including a housing 2 which has two parts, namely a base part 2A and a cover part 2B. In the exemplary embodiment, the cover part 2B is detachably attached to the base part 2A through latching connections 4. The housing 2 has an approximately cuboid basic geometry and extends in a longitudinal direction 6. A housing limb 8 is drawn out somewhat further on one of the two sides in the longitudinal direction 6 and has approximately half the width of the housing, in the same way as a recessed subarea. A side wall section of the housing limb 8, which is formed for the recessed subarea, is partially continued as a partition wall 9 within the housing 2.

A movement opening 10 is formed in a narrow face of the housing limb 8, opposite the partition wall 9, and occupies virtually the entire height of the narrow face. The movement opening 10 is constructed to be open toward the cover part 2B, that is to say, when the cover part 2B is closed, the cover part 2B forms a rim face of the movement opening 10. An outlet opening 12 is formed on the front end face of the recessed subarea. This substantially covers the entire cross-sectional area of the recessed subarea.

A plurality of guide webs 14 are formed on the base part 2A and define an approximately U-shaped guide path. The guide webs 14 are disposed on both sides of the partition wall 9 in this case, as a result of which the guide path runs in a U-shape around one end of the partition wall 9. The guide webs 14 each have a contact surface facing away from the partition wall 9. It is also possible to form one continuous guide, instead of the individually formed guide webs 14. The base part 2A, together with the guide webs 14 and the latching elements 4 which are fitted on the outside, are preferably in the form of an integral or one-piece plastic injection-molded part.

A specifically constructed guide web 14 is provided at the end of the partition wall 9 and has a holding tab 18 which is oriented parallel to a rear housing wall 20 of the base part 2A. An approximately bracket-like holding area is formed in this way between the holding tab 18 and the rear housing wall 20.

A prefabricated cable harness element 22 is inserted into the base part 2A during an assembly process. This cable harness element 22 includes a first interface 24A, which in the exemplary embodiment has an attachment flange for attaching the cable harness element 22 to a motor vehicle sliding door. In addition a plug, which is not illustrated herein, is preferably attached to this first interface 24A, and allows a cable harness element which has been laid within the sliding door to be electrically connected to the remainder of the motor-vehicle power supply system, through the use of a simple plug connection. As an alternative to this, the individual lines can also be passed on directly to an end user or component disposed in the sliding door.

A first cable subelement 26A is adjacent the first interface 24A and, in the exemplary embodiment, is in the form of a multicore round cable. The first cable subelement 26A extends to a movement element 28, which is formed from two parts and has a sliding body 28A as well as a rotating body 28B, which is disposed in such a way that it can rotate relative to the sliding body. The first cable subelement 26A is passed through the movement element 28 and merges into a second cable subelement 26B, which is routed within the housing 2 to a second interface, in this case in the form of a plug 24B. In this case, the plug 24B is held in the outlet opening 12.

The second cable subelement 26B is routed along a spring strip 30, one end of which is mounted in the sliding body 28A, while its other end is attached to the base part 2A. The spring strip 30 is a simple, thin flat metal sheet, which can easily be bent and has a certain amount of spring elasticity. The width of the spring strip 30 is somewhat less than the free internal height between the base part 2A and the cover part 2B. Overall, the width of the spring strip 30 is adapted in such a way that the spring strip is routed between the rear housing wall 20 and the cover part 2B. This means that the spring strip 30 has only enough play in order to prevent jamming within the housing 2.

In order to achieve a routing that is as good as possible, provision is therefore also made for the holding tab 18, which is oriented parallel to the rear housing wall 20, to engage in a corresponding cut-out within the cover part 2B when in the installed state. This means that the holding tab 18 is aligned with the cover part 2B in the installed state, and furthermore has a material thickness which corresponds approximately to the thickness of the cover part 2B. The holding tab 18 is therefore aligned with the cover part 2B, both on the inside and on the outside.

In order to provide for attachment of the spring strip 30 on the housing side, the last guide web 14 before the outlet opening 12 is at the same time also in the form of a holding web and has an insertion opening 32 into which the spring strip 30 can be inserted from above, that is to say in the direction of the rear housing wall 20.

When the cable harness element 22 is being fitted into the housing 2, the entire cable harness element 22 is inserted from above into the base part 2A, with the housing 2 open. In the process, one end of the spring strip 30 is inserted into the insertion opening 32. The sliding body 28A is inserted into the movement opening 10. The spring strip 30 is held in the bracket-like holding area between the holding tab 18 and the rear housing wall 20. In this case, the sliding body 28A is located in a movement limit position, that is to say it rests on a housing rim. The holding tab 18 results in the entire cable harness element 22 initially being fixed in such a way that the cover part 2B can be fitted without any problems. As soon as the cover part 2B has been attached, the cover part 2B together with the base part 2A forms the guide for the internal cable subelement 26B, in particular for the spring strip 30 along the external contour of which the second cable subelement 26B is routed.

In order to guide the sliding body 28A, a somewhat raised guide web 34 is formed on the base part 2A, as part of the rear housing wall 20, on its rim face toward the circumferential side wall. Rim webs 36 associated with the sliding body 28A engage behind this guide web 34 in a form-locking manner at right angles to the longitudinal direction 6, thus forming a type of rail guide. A corresponding guide web is formed in the same way on the side of the cover part 2B.

The guide web 34 extends around in a U-shape on the bottom of the base part 2A. Overall, this results in a depression being formed in the central area of the rear housing wall 20. The spring strip 30 is routed within this depression. During operation, the spring strip 30 therefore rests on the inner rim of the guide web 34 and slides along the guide web 34. Overall, this results in defined and secure routing. The cover part 2B is also formed in the same way. A free internal height of the housing is therefore formed by the depressions in the base part 2A and, corresponding thereto, in the cover part 2B.

The two-part configuration of the movement element with the rotating body 28B ensures that a cable 26 is introduced into the housing 2 in such a way that it can rotate. The rotating body 28B in this case is formed substantially by a U-shaped bearing piece 38, into which a T-shaped tubular piece 40 is inserted, in such a way that it can rotate, as a cable insertion element. The cable 26 is inserted into the movement element 28 through the T-shaped tubular piece 40.

When the sliding body 28A moves in the longitudinal direction 6, the spring strip 30 as well as the cable subelement 26B, which is routed along it, are pushed to the rear into the free space in the housing, with the sliding body 28A. Due to the resilient configuration of the spring strip 30, it is pushed outward against the guide web 34, and is guided by it. The interaction of the spring elasticity with the guide web 34 results in a bending radius which remains constant, thus ensuring that the second cable subelement 26B is always routed in a defined U-shape.

By way of example, the movement of the sliding body 28A is caused by passive positive guidance when a component, in particular the sliding door, to which the first interface 24A is attached, is moved relative to a further component in particular the motor vehicle bodywork. When the sliding door is being opened and closed, the sliding body 28A therefore slides between its two limit positions, which are defined in particular by the rims of the movement opening 10.

The invention claimed is:

1. A line routing device for routing an electrical cable between two components, the components being movable relative to one another, the line routing device comprising:
    a housing having a housing wall, a movement opening extending in a longitudinal direction, an outlet opening, a base part and a cover part;
    a movement element movably mounted in said movement opening;
    a spring strip bent in a U-shape, attached to said movement element and having an end remote from said movement element being fixed to said housing;
    the cable being attached to said movement element and routed along said spring strip to said outlet opening;
    said movement element and said spring strip configured to be inserted into said housing upon removing said cover part of said housing; and
    a mounting aid disposed on said base part and configured for holding said spring strip in a defined mounting position between said mounting aid and said housing wall upon removing said cover part of said housing, said mounting aid being a holding tab formed on said base part and engaging over said spring strip in said defined mounting position.

2. The line routing device according to claim 1, wherein said defined mounting position is a movement limit position.

3. The line routing device according to claim 1, wherein said movement opening defines opposite rim faces, and said movement element is a sliding element engaging in a form-locking manner around said opposite rim faces.

4. The line routing device according to claim 1, wherein the cable is passed through said movement element.

5. The line routing device according to claim 1, wherein said movement element has a sliding body and a rotating body mounted for rotation relative to said sliding body, and the cable is passed through said rotating body.

6. The line routing device according to claim 1, which further comprises a guide web disposed on said base part as a U-shaped guide for said spring strip.

7. The line routing device according to claim 6, wherein said guide web also acts as a guide for said movement element in vicinity of said movement opening.

8. The line routing device according to claim 1, which further comprises first and second cable interfaces, a first cable subelement routed from said first cable interface to said movement element, and a second cable subelement routed along said spring strip to said second cable interface within said housing, forming a prefabricated mounting unit.

9. The line routing device according to claim 1, wherein one of the two components is a sliding door.

10. A prefabricated mounting unit, comprising:
    first and second cable interfaces;
    a first cable subelement routed from said first cable interface to said movement element of the line routing device according to claim 1; and
    a second cable subelement routed along said spring strip to said second cable interface within said housing.

* * * * *